United States Patent [19]

Shimizu et al.

[11] Patent Number: 4,608,671

[45] Date of Patent: Aug. 26, 1986

[54] BUFFER STORAGE INCLUDING A SWAPPING CIRCUIT

[75] Inventors: Tsuguo Shimizu, Sayama; Kenichi Wada, Zama; Yooichi Shintani, Kokubunji; Akira Yamaoka, Hadano, all of Japan

[73] Assignee: Hitachi, Ltd., Tokyo, Japan

[21] Appl. No.: 490,518

[22] Filed: May 2, 1983

[30] Foreign Application Priority Data

Apr. 30, 1982 [JP] Japan ................................ 57-71211

[51] Int. Cl.[4] ............................................... G11C 8/00
[52] U.S. Cl. .................................... 365/230; 365/189

[58] Field of Search ............... 365/189, 200, 201, 210, 365/230, 231

[56] References Cited

U.S. PATENT DOCUMENTS 4,303,993 1/1981 Panepinto, Jr. et al. ........... 365/230

Primary Examiner—Joseph A. Popek
Attorney, Agent, or Firm—Antonelli, Terry & Wands

[57] ABSTRACT

In a buffer storage device where swapping of data is employed, plural candidates for replacement of data in a buffer are determined in response to any access to the buffer storage, and, when the replacement is required, one of the candidates is selected so that processing time for replacement can be minimum.

4 Claims, 6 Drawing Figures

FIG. 6

| # | RA(0) | | RA(1) | | B OF Q REQUEST | SELECTED ROW NUMBER |
|---|---|---|---|---|---|---|
| | C | B | C | B | | |
| 0 | 0 | 0 | 0 | 0 | 0 | RA(0)/RA(1) |
| 1 | 0 | 0 | 0 | 1 | 0 | RA(0)/RA(1) |
| 2 | 0 | 1 | 0 | 0 | 0 | RA(0)/RA(1) |
| 3 | 0 | 1 | 0 | 1 | 0 | RA(0)/RA(1) |
| 4 | 0 | 0 | 0 | 0 | 1 | RA(0)/RA(1) |
| 5 | 0 | 0 | 0 | 1 | 1 | RA(0)/RA(1) |
| 6 | 0 | 1 | 0 | 0 | 1 | RA(0)/RA(1) |
| 7 | 0 | 1 | 0 | 1 | 1 | RA(0)/RA(1) |
| 8 | 0 | 0 | 1 | 0 | 0 | RA(0) |
| 9 | 0 | 0 | 1 | 1 | 0 | RA(0) |
| 10 | 0 | 1 | 1 | 0 | 0 | RA(0) |
| 11 | 0 | 1 | 1 | 1 | 0 | RA(0) |
| 12 | 0 | 0 | 1 | 0 | 1 | RA(0) |
| 13 | 0 | 0 | 1 | 1 | 1 | RA(0) |
| 14 | 0 | 1 | 1 | 0 | 1 | RA(0) |
| 15 | 0 | 1 | 1 | 1 | 1 | RA(0) |
| 16 | 1 | 0 | 0 | 0 | 0 | RA(1) |
| 17 | 1 | 0 | 0 | 1 | 0 | RA(1) |
| 18 | 1 | 1 | 0 | 0 | 0 | RA(1) |
| 19 | 1 | 1 | 0 | 1 | 0 | RA(1) |
| 20 | 1 | 0 | 0 | 0 | 1 | RA(1) |
| 21 | 1 | 0 | 0 | 1 | 1 | RA(1) |
| 22 | 1 | 1 | 0 | 0 | 1 | RA(1) |
| 23 | 1 | 1 | 0 | 1 | 1 | RA(1) |
| 24 | 1 | 0 | 1 | 0 | 0 | RA(0)/RA(1) |
| 25 | 1 | 0 | 1 | 1 | 0 | RA(1) |
| 26 | 1 | 1 | 1 | 0 | 0 | RA(0) |
| 27 | 1 | 1 | 1 | 1 | 0 | RA(0)/RA(1) |
| 28 | 1 | 0 | 1 | 0 | 1 | RA(0)/RA(1) |
| 29 | 1 | 0 | 1 | 1 | 1 | RA(0) |
| 30 | 1 | 1 | 1 | 0 | 1 | RA(1) |
| 31 | 1 | 1 | 1 | 1 | 1 | RA(0)/RA(1) |

BUFFER STORAGE INCLUDING A SWAPPING CIRCUIT

BACKGROUND OF THE INVENTION

The present invention relates to a storage device for a digital computer, especially to a buffer storage including a swapping circuit for store control.

A conventional computer employs a buffer storage (BS) with a relatively small capacity but with a high speed comparable to the speed of a central processing unit (CPU), while a main storage (MS) has a relatively low speed. For this buffer storage, the store operation is controlled according to a swapping control, as will be explained below.

When a write request is generated, store data is written into the BS in response to that request, but the data is not stored into the MS in response to the request. The renewed data in the BS is transferred to the MS later on, as follows. Let us assume that a data block DATA 1 is already stored in the BS includes store data resulting from a write request. When a read request for the BS is generated within the CPU and it becomes necessary to transfer a data block DATA2 which includes the requested data from the MS to the BS because the data block is not already contained in the BS, a location where the data block DATA2 is to be stored is determined according to a predetermined rule. If it happens that the location where the data block DATA1 is stored is selected to be the location for storing the data block DATA2, the data block DATA1 must be transferred from the BS to the MS. However, the data block DATA1 includes the store data, as already assumed, and therefore, the contents of the data block DATA1 are different from the contents thereof when the block was originally transferred from the MS. Thus, it becomes possible to reflect the result of the previous write operation into the BS upon the MS, by transferring the data block DATA1 from the BS to the MS before the data block DATA2 is stored into the BS. In other words, the data block DATA1 is exchanged with the data block DATA2. This exchange is called swapping.

It is to be noted that swapping does not always follow a BS access request. For example, if a location where a data block DATA3 which has not received a store operation is selected as a location for the data block to be received from the MS, it is not necessary to transfer the data block DATA3 from the BS to the MS because the MS already has a correct copy of that data block. Therefore, it is desirable to select a location where a new data block not in the BS is to be stored in such a way that swapping is not required, since this will save operating time. According to the prior art, however, this determination is performed irrespective of whether or not swapping is required. For example, see Japanese Laid-Open Patent Application No. 52-2228 (1977).

Furthermore, it is to be noted that the processing time for swapping depends upon the situation. Usually, the MS comprises plural banks which can be accessed in parallel to each other. If the data blocks DATA1 and DATA2 belong to different banks, reading of the data block DATA2 from the MS can be performed in parallel with storing of the data block DATA1 into the MS. Therefore, the swapping time is short. If the two data blocks belong to the same bank, the storing operation is performed after the reading operation. Therefore, the swapping time is longer. This shows that it is desirable to select the swapping location so that the swapped data blocks belong to different banks. According to the prior art, however, such determination is made irrespective of whether or not this bank conflict occurs.

SUMMARY OF THE INVENTION

Therefore, it is an object of the present invention to provide a buffer storage device which needs less time for replacement of data.

In order to attain this objective, the present invention includes a circuit for determining plural candidates for replacement and a circuit for selecting one of the candidates so that the time for replacing can be minimized.

BRIEF DESCRIPTION OF DRAWINGS

FIG. 6 shows a selection rule by a swapping control of FIG. 5.

DESCRIPTION OF A PREFERRED EMBODIMENT

Figure 1:
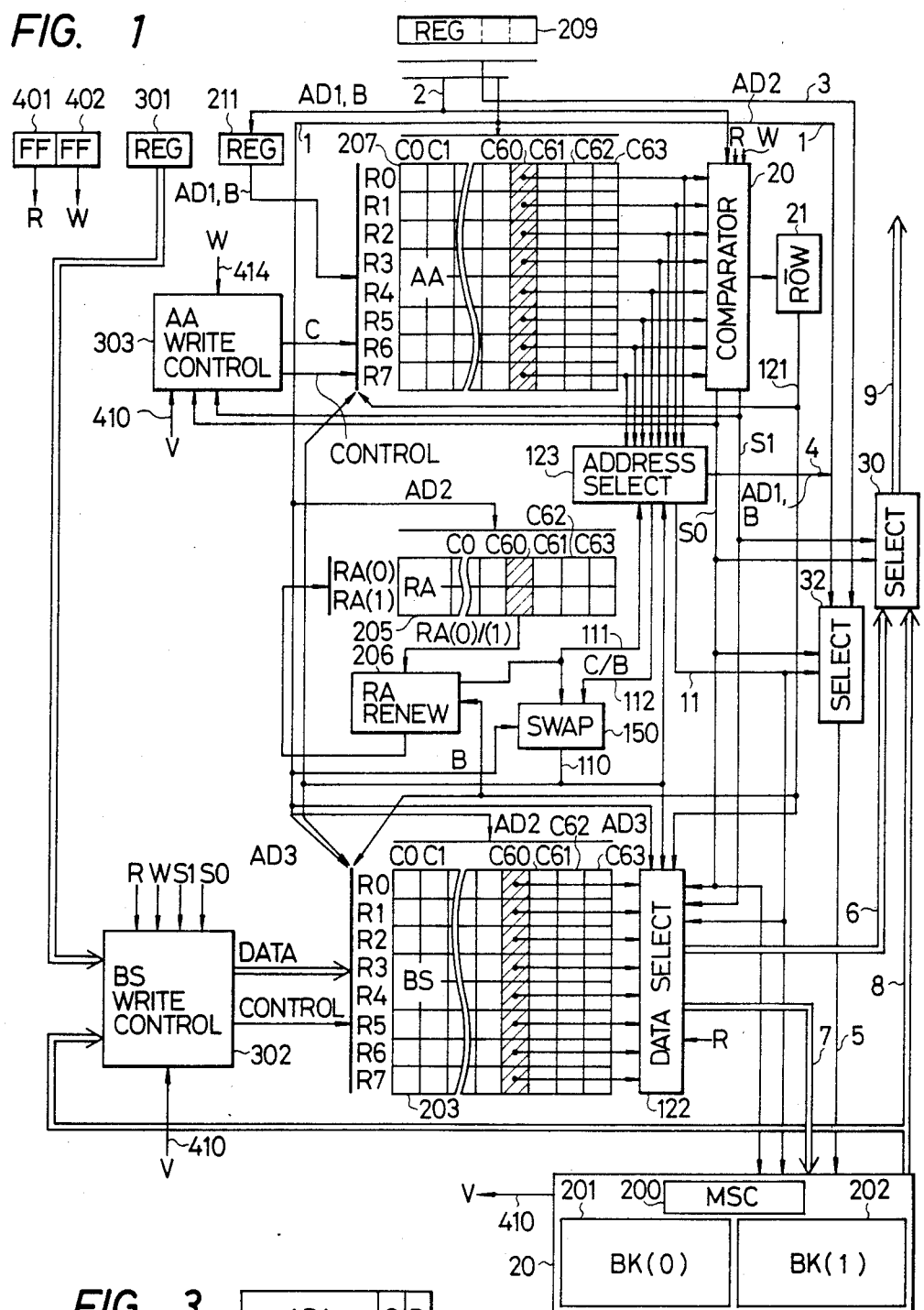
FIG. 1 shows an embodiment of the present invention.
Figure 3:
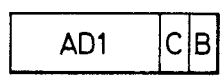
FIG. 3 shows data stored in an address array of FIG. 1.

As is shown in FIG. 1 BS(203) is divided into 64 columns and 8 rows, and includes 512 entries in all. An address array 207 is provided which has the same configuration as the BS. Each entry of the address array 207 corresponds to one of the entries in the BS, and includes address information and control data which is required for swap control, as will be explained later on. A replacement array 205 is provided which comprises in accordance with this invention two replacement arrays RA(0) and RA(1). Those replacement arrays are divided into 64 columns. Therefore, in this embodiment the replacement array 205 includes two entries for each column in contrast to the single row replacement array of the prior art, as disclosed in the aforementioned Japanese Laid-Open Application No. 52-2228. Each entry of each column of the replacement array 205 stores a data signal uniquely indicating a row number which is used when a new data block is stored in the BS. Of course, the number of entries for each column may be more than two in accordance with this invention. The entries of the replacement array 205 are renewed by a renewal circuit 206, each time a BS read or write request is generated. Storage in the MS(20) is interleaved with a bank 0 (201) and bank 1 (202). A main storage control 200 controls accesses to these banks. The number of banks included in the MS may be larger than two.

Figure 2:
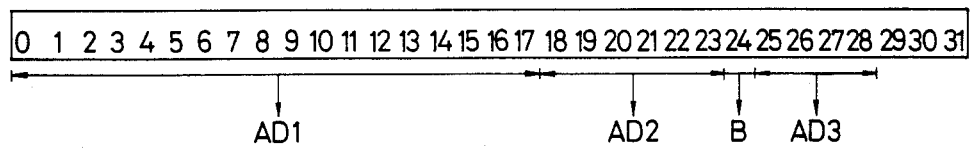
FIG. 2 shows an address used in the embodiment of FIG. 1.

When an access request to the BS is generated, the request address is stored in a register 209. The address comprises 32 bits in this embodiment, as shown in FIG. 2. Bits 0 to 28 designate the 8 byte data required. Bits 29 to 31 designate one byte within these 8 bytes, but these bits are not used for an access to the BS. Bits 0 to 24 designate a block address which includes the required 8 bytes. The size of one data block is 128 bytes.

Each transfer between the MS and the BS is performed for one data block. The bits 18 to 23, designated as AD2, are used to access the address array 207 and the BS. Bit 24 designates a bank number which includes a data block containing the required 8 bytes, and is called a bank address bit. Bits 25 to 28, designated as AD3, are used to designate the required 8 bytes within a block. Bits 0 to 17, designated AD1 are stored in address array 207.

Each entry of the BS includes a data block. A data block is stored in the BS at one of 8 rows and at a column corresponding to the address AD2 for the block. The address AD2 is called the column address, hereafter. Each entry of the address array 207 includes address AD1 and a B, and C bit. The address corresponds to a data block stored in a corresponding entry of the BS. The C bit represents whether or not a write (store) request has been generated for a data block stored in a corresponding entry of the BS.

When an access address is set in the register 209, a flipflop 401 or 402 is set, depending upon whether a request for the access is for a read operation or a write (store) operation. When the request is a write request, write data is also stored in a register 301. The set outputs of the flipflops 401, 402 are hereafter called a read signal R and a write signal W. The column address AD2 within the register 209 is supplied to the address array 207, the replacement array 205 and the BS by way of a line 1. Let us assume that the address AD2 designates a column C60. The access to the BS is according to a known set associative method, as will be explained below. Eight entries belonging to the column C60 and rows R0 to R7 in the address array 207 are read, to send the data stored therein to a comparator 120, which compares the readout address data AD1 and B with corresponding address data AD1 and B of a requested address provided by line 2 from the register 209. The comparator 120 provides a coincidence signal S1 or non-coincidence signal S0, when a write signal W or a read signal R is provided thereto. The coincidence signal S1 is generated when the address data AD1, B of the request address coincides with any one of the 8 readout data of the address array 207. The non-coincidence signal S0 is generated otherwise. When coincidence is detected, row number generator 21 generates a row number identifying the coincident row.

[In case of a read request]

Suppose that a coincidence signal S1 is generated for a read request address. Eight data blocks are read out of the eight entries belonging to the column C60 and rows R0 and R7 of the BS in response to the requested column address AD2 provided by a line 1. A data selector 122 includes a circuit (not shown) which selects the 8 byte data designated by an address AD3 given by a line 1 within a data block read out of a location having a column address C60 and a row number given by way of a line 121 from the row number generator 21. The selection is performed when the coincidence signal S1 and the read signal R are provided thereto. The selected 8 bytes is sent to a selector 30 by way of a line 6. The selector 30 transmits the data on line 6 to line 9, when the coincidence signal S1 is provided thereto.

In parallel to the reading operation of the BS, the replacement array 205 is renewed by the renewal circuit 206. That is, two entries RA(0), RA(1) are read out from the column C60 of the array 205 in response to the column address AD2 provided thereto by way of a line 1. The renewal circuit 206 decodes the two entries RA(0), RA(1) to find two row numbers for replacement, and determines new entries RA(0), RA(1) indicating two renewed row numbers in response to the signals S0 and S1 provided by the comparator 120 and in response to the coincident row number provided by the row number generator 21 by way of a line 121, to store the renewed two entries RA(0), RA(1) indicating the renewed row numbers into the address array 205. The renewed row numbers represent candidates of entries in the BS which may be used to store a new data block transferred from the MS. The renewal is performed in response to a BS access request. Various rules are known which have been used to date to determine the replacement candidates in accordance with a conventional replacement algorithm. For example, a first-in-first out rule or a least-recently-used (LRU) rule are typically used. The LRU rule is employed here, for example, and the renewal circuit 206 determines the two renewed entries indicating two row numbers which are least recently used. One method for this determination is to one renewed entry indicating one row number respectively for a group of rows R0 to R3 and for a group of rows R4 to R7, with a column C60. The determined two renewed entries indicating row numbers are respectively stored in the replacement arrays RA(0) and RA(1). For each BS access request, it is sufficient to determine one renewed entry indicating one row number for a group which includes the coincident row number given by the generator 21. An example of a renewal circuit for a single row renewal array is disclosed in the aforementioned Japanese Laid-Open Application No. 52-2228.

Thus, a BS access is finished when a data requested by a read request exists in the BS.

In case a read request is generated for data not in the BS, the following operations are required: (1) reading out a block including the requested data from the MS, (2) replacing a block existing in the BS with this readout block, (3) rewriting an entry of the address array 207 corresponding to the BS entry where the replacement is performed, and (4) writing the replaced block in the BS back into the MS, if the replaced block has been subjected to a writing operation. These operations are performed as follows.

The non-coincident signal S0 is generated by the comparator 120, and the MS receives this signal S0 as a read request signal. The related read address is provided from the register 209 by way of a line 3, a selector 32 and a line 5. The selector 32 is constructed so that it selects the line 3, when the signal S0 is provided thereto. The selector 32 selects a line 1 when a signal on a line 11 is 1, as will be explained later on. A data block read out from the MS in response to the read address is sent by a line 8 to a selector 30, which selectively connects the line 8 to a line 9 when the signal S0 is 1. Thus, the readout data block is sent to a CPU (not shown) by way of the line 9.

Writing this readout data block into the BS and renewal of the address array 207 is performed as described below.

Figure 5:
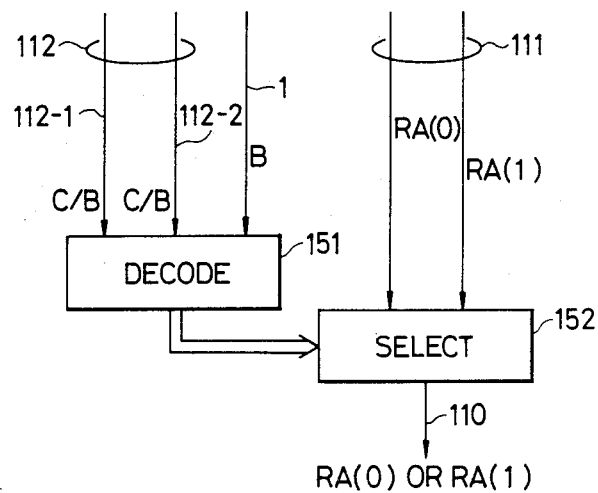
FIG. 5 shows a schematic block diagram of a swapping control of FIG. 1.
Figure 4:
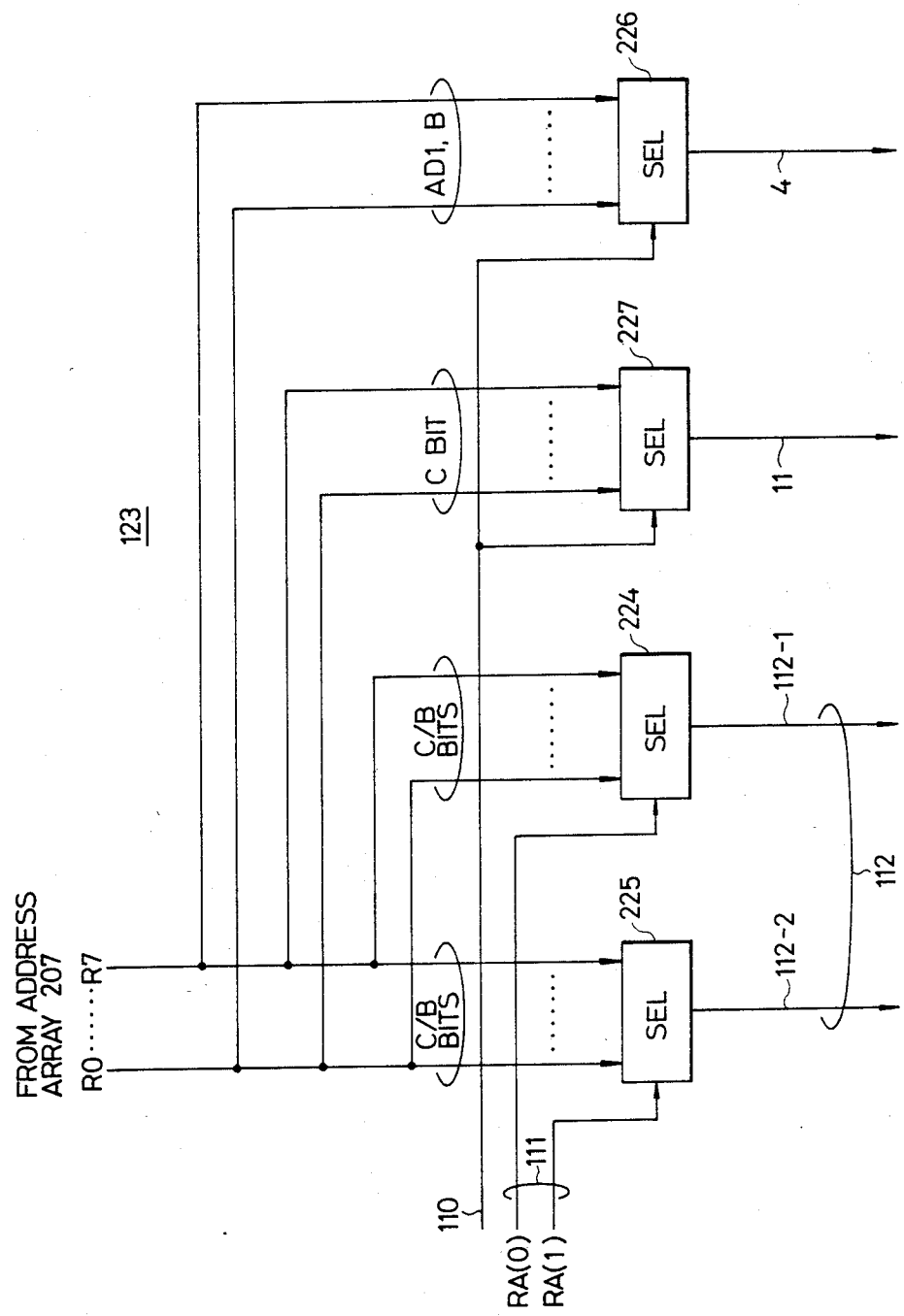
FIG. 4 shows a schematic block diagram of an address selector of FIG. 1.

Row numbers determined by the renewal circuit 206 for replacement based upon the two entries RA(0), RA(1) designated by the column address AD2 are sent to an address selector 123 by a line 111. This selector 123 selects two entries among entries for a column C60 and rows R0 to R7 in response to the two row numbers. As shown in FIG. 4, selectors 224, 225 are provided for these two selections to provide C and B bits of selected entries respectively to a swapping control 150 by way of a line 112. The swapping control 150 determines an entry to be replaced in the BS, in response to these two pairs of C and B bits. Referring to FIG. 5, which shows the details of the swapping control 150, the line 112 comprises lines 112-1 and 112-2, respectively for receiving a pair of C and B bits selected by the selector 224 and 225 (FIG. 4). As shown in FIG. 4, the selector 224 selects a pair of C and B bits in response to a row number provided by the renewal circuit 207 based upn the entry RA(0) from the replacement array 207, and the selector 225 selects a pair of C and B bits in response to a row number provided by the renewal circuit 207 based upon the entry RA(1) from the replacement array. The decoder 151 receives those two pairs of bits on the lines 112-1 and 112-2, as well as a bank address B on line 1 of the requested address, to provide a selection signal to the selector 152 which selects one of the two row numbers RA(0) and RA(1) through a line 111, in response to this selection signal. FIG. 6 shows which of the two row numbers should be selected for different combinations of the values of the five signals. In FIG. 6, the selected row numbers for cases 0 to 7 and 24, 27, 28 and 31 are shown as RA(3)/RA(1). This shows either of the row numbers RA(0) and RA(1) can be used. It is enough to select only the row number RA(0) for these cases.

The selection for FIG. 6 is based upon the following rules.

(1) Select a row number which corresponds to an entry which does not need to be written back into the MS, that is an entry for which C=0.

(2) If there is no entry for which C=0, select a row number which corresponds to an entry which is written back into a bank in the MS which is different from a bank in which a data block for a request address is contained.

(3) If the selections according to the rules above are impossible, select any one of the two row numbers.

If the selection according to the rule (1) above is possible, processing for the access request is completed when a data block read out of the MS is stored in the BS, because a data block in the BS does not need to be written back to the MS. Therefore, the processing time required for the access request is short. If the selection according to the rule (2) above is possible, the operation for writing back of a data block in the BS to the MS can be performed in parallel to the operation for reading a data block including requested data from the MS. Therefore, the processing time required for the access request is not so long.

Thus, according to the present embodiment, it is possible to select, among plural candidate row numbers, one which will need shorter processing time than any other row numbers.

Explanation is given for a writing operation into the BS of data read out from the MS. The operation is the same, irrespective of which of the rules is applied.

The BS write control 302 includes a circuit (not shown) which operates under a condition that the read signal R and the non-coincidence signal S0 is provided thereto. The circuit (not shown) sends to the BS data on line 8 and a signal which shows that the row number provided by the swapping control 150 on line 110 is valid, and the circuit (not shown) also sends a write command to the BS in response to a data valid signal V on line 410 which is provided by the MS when data is read out on line 8 from the MS. The row number on line 110 shows a row number for an entry which is determined by the swapping control 150 as a replacement entry. The BS writes the data provided by the BS write control 302 in response to the write command at an entry belonging to a column C60 which is designated by the column address AD2 on line 1 and to a row which is designated by the row number on line 110.

In parallel to this writing operation in the BS, the address array 207 is renewed as follows. Data to be written into the address array 207 consists of addresses AD1 and B of the request address and control bit C. The address data is provided by a register 211. The control bit C should be 0, because it is a situation where new data is transferred from the MS to the BS. The address array 207 includes a circuit (not shown) which operates as follows when the write signal W is not provided and the non-coincidence signal S0 is provided thereto. This circuit (not shown) provides the control bit with a value of 0 and a signal which indicates that the row number on line 110 provided by the swapping control 150 is valid, and this circuit further provides a write command in response to a data valid signal on line 410. As a result, the entry belonging to a column C60 designated by the column address on line 1 and to a row designated by the swapping control 150 receives the data AD1, B and C. Thus, the writing operation for the BS and the address array 207 is completed. When the selection rule (2) or (3) is employed by the swapping control 150, it is necessary to write back data within the BS into the MS, as follows.

The row number determined by the swapping control 150 is sent to selectors 226, 227 (FIG. 4) via line 110. The selector 227 selects a C bit of an entry having the row number and belonging to the column C60 and sends it to the MS via line 11. The MS interprets that if the value of the C bit is 1, as in the present case, the C bit manifests a write request to the MS. The write address for this request is generated as follows. The selector 226 within the address selector 123 selects address data AD1 and B of an entry having the row number on line 110 and belonging to the column C60, and sends the data to line 4, to combine the selected data with address data AD2 of a request address provided via line 1 by the register 209. The combined address is used as the MS access address. The selector 32 selects this combined address when the signal on line 11 is 1, and sends it to the MS via line 5. The data to be written into the MS is given as follows. The BS provides data belonging to all entries of the column C60 in parallel. The data selector 122 includes a circuit (not shown) which selectively transfers data of an entry designated by the row number on line 110, when the signal on line 11 and the non-coincidence signal S0 are both 1. The selected data is transferred to the MS via line 7. Of course, the transfer is performed before the data including the requested data read out from the MS is written into the BS. The main storage control 200 accesses the bank (0) or (1) in response to a bank address B provided thereto. If the selection rule (2) above is employed, the bank numbers for reading from the MS and writing into the MS are different. Therefore, these two operations can be performed in parallel. If the selection rule (3) is employed, however, these two operations need the same bank. In this case, a reading operation in response to the non-coincidence signal S0 is performed first and then the writing operation in response to the C bit on line 11 is performed. The main storage control 200 includes a storage for holding data on line 7 for this delayed writing.

[In case of write request]

In this case the flipflop 402 is set and the write signal W is generated. Write data is stored in the register 301 and the write address is stored in the register 209.

Comparison is performed by the comparator 20, as in the case of a read request. If the coincidence signal S1 is generated as a result of this comparison, writing into the BS is performed as follows.

The BS write control 302 includes a circuit (not shown) which operates as follows when the write signal W and the coincidence signal S1 are provided thereto. This circuit (not shown) provides data in the register 301 as write data as well as a signal which shows the coincident row number given, via line 121, by the row number generator 21, and a partial write command. The BS stores the write data at a location designated by the address AD3 on line 1 within an entry having a row number designated by line 121 and belonging to a column designated by the column address AD2 on line 1.

In parallel to this writing operation, the address array 207 is renewed as follows. The address array control 303 includes a circuit (not shown) which operates as follows when the write signal W and the coincidence signal S1 are provided thereto. This circuit (not shown) provides a C bit of value 1, a signal which indicates the row number on line 121 is valid and a write command. The address array 207 stores the address AD1, B provided by the register 211 as well as the generated C bit at an entry having the row number of line 121 and belonging to a column designated by the column address AD2 on line 1. Thus, a C bit of value 1 is written into the entry.

The renewal of the replacement array 205 is performed as in the case of a read request. If the non-coincidence signal S0 is generated as a result of the comparison by the comparator 120, it is necessary to write data of the register 301 into the BS, after an entry of the BS is swapped. The swapping is performed quite in a similar way as in the case of a read request. The MS performs a read operation in response to the non-coincidence signal S0 with an address given via line 5 from the selector 32. The read out data is stored in the BS by the BS write control 302, which includes a circuit (not shown) which operates as follows when the write signal W and the non-coincidence signal S0 are provided thereto. This circuit (not shown) sends data on a line 8 to the BS and sends to the BS a signal which shows that the row number on line 110 is valid. This circuit (not shown) further sends a write command to the BS in response to the data valid signal V on line 410. Thus, the data on line 8 is stored at an entry corresponding to the row number on line 110 and a column designated by the column address AD2 on line 1. This circuit (not shown) thereafter sends data provided by the register 301 and a partial write command to the BS, which stores the newly provided data at a location designated by the address AD3 on line 3 within the same entry.

If the C bit for this entry is 1, the original data stored therein is swapped out to the MS before the data from the MS is stored therein according to the same procedure as explained before with respect to the read request. It is to be noted further that the entry for which replacement should be carried out is determined by the swapping control 150, as in case of the read request.

What is claimed is:

1. A buffer storage system comprising:
   first storage means having a plurality of addressable storage locations for storing data signals;
   buffer storage means having a plurality of addressable storage locations and being connected to said first storage means for storing at least some of the data signals stored by said first storage means;
   first means for holding signal pairs including an address signal and a control signal, each signal pair corresponding to the data stored in a respective one of the storage locations of said buffer storage means, said address signal designating an address of a storage location within said first storage means from which or into which the corresponding data signal was fetched or is to be stored, and said control signal having a first or second value depending upon whether or not the corresponding data signal needs to be stored into said first storage means when the data signal is to be replaced in said buffer storage means by a new data signal;
   second means for indicating plural candidate replacement locations within said buffer storage means so that any one of said plural replacement locations can be used as a storage location for a new data signal, including means for changing said indicated candidate replacement locations according to a predetermined replacement algorithm in response to an applied read or write request;
   third means connected to respond to said plural indicated candidate replacement locations provided by said second means for reading out of said first means signal pairs each consisting of an address signal and a control signal respectively corresponding to said indicated candidate replacement locations;
   fourth means connected to said second and third means for selecting one of said candidate replacement locations for which the control signal held by said first means has the second value;
   fifth means connected to said buffer storage means and responsive to an applied read request for reading out of said first storage means a data signal requested by said read request to supply said read out data signal and for writing said read out data signal into said selected candidate replacement location of said buffer storage means without writing a data signal already stored therein into said first storage means; and
   sixth means responsive to said selection of said candidate replacement location for writing into said first means a signal pair consisting of the address signal accompanying said said request and a control signal having the second value as a signal pair for the selected candidate replacement location.

2. A buffer storage system according to claim 1, wherein said first storage means comprises plural banks of storage locations which can be accessed independently from each other; and
   wherein said fourth means further includes means for selecting a second one of said indicated candidate replacement locations for which the address signal held by said first means belongs to a different bank of said first storage means from a bank which includes the storage location identified by the request address, in such a way that said selection of said second candidate replacement location is performed only when all of the control signals for the indicated candidate replacement locations have the first value.

3. A buffer storage system according to claim 2, wherein said fifth means further includes means responsive to the selection of the second candidate replacement location for reading out a first data signal already written in said second candidate replacement location of said buffer storage means to write the read out first data signal into a first bank of said first storage means based upon an address signal for the second candidate replacement location read out by said third means, and for reading out a second data signal requested by said read request from a second bank of said first storage means based upon the request address and in parallel to the writing into the first bank, so as to write the read out second data signal into said second candidate replacement location of said buffer storage means.

4. A buffer storage system according to claim 1, wherein said buffer storage means and said first means each comprise a corresponding number of storage locations addressably arranged in plural rows and plural columns, and wherein said second means includes a plurality of storage locations addressably arranged in at least two rows and a number of columns equal to the number of columns provided in said buffer storage means and said first means, so that at least two candidate replacement locations are stored for each column of said second means.

* * * * *